United States Patent
Morel

(10) Patent No.: US 7,224,089 B2
(45) Date of Patent: May 29, 2007

(54) LINEAR MOTOR WITH A SEGMENTED STATOR

(75) Inventor: Jean-Pierre Morel, Les Fourgs (FR)

(73) Assignee: Etel, S.A., Môtiers (CH)

( * ) Notice: Subject to any disclaimer, the term of this patent is extended or adjusted under 35 U.S.C. 154(b) by 0 days.

(21) Appl. No.: 11/261,297

(22) Filed: Oct. 28, 2005

(65) Prior Publication Data

US 2006/0097584 A1 May 11, 2006

(30) Foreign Application Priority Data

Nov. 8, 2004 (CH) .................................. 01831/04

(51) Int. Cl.
*H20K 41/00* (2006.01)
(52) U.S. Cl. .................... 310/12; 310/13; 310/254; 310/258
(58) Field of Classification Search ................ 310/12, 310/254, 258, 13
See application file for complete search history.

(56) References Cited

U.S. PATENT DOCUMENTS

| | | | |
|---|---|---|---|
| 4,665,329 A * | 5/1987 | Raschbichler | 310/13 |
| 4,728,382 A | 3/1988 | Raschbichler | |
| 5,929,541 A * | 7/1999 | Naito et al. | 310/12 |
| 6,326,708 B1 * | 12/2001 | Tsuboi et al. | 310/12 |
| 6,407,471 B1 | 6/2002 | Miyamoto et al. | |
| 6,504,284 B1 * | 1/2003 | Kazama et al. | 310/259 |
| 6,661,124 B1 * | 12/2003 | Seki et al. | 310/12 |
| 6,713,899 B1 | 3/2004 | Greubel et al. | |
| 6,879,079 B2 * | 4/2005 | Vollmer | 310/254 |
| 7,019,433 B2 * | 3/2006 | Hashimoto et al. | 310/259 |
| 2006/0016366 A1 | 1/2006 | Feix et al. | |

FOREIGN PATENT DOCUMENTS

| | | |
|---|---|---|
| DE | 31 10 339 A1 | 9/1982 |
| DE | 102 53 136 A1 | 5/2004 |
| DE | 103 17 014 A1 | 10/2004 |
| EP | 0 959 549 A1 | 11/1999 |
| JP | 2004-289899 A | 10/2004 |

OTHER PUBLICATIONS

Patent Abstracts of Japan published by Japanese Patent Office, No. 12, Dec. 5, 2003, one page.

* cited by examiner

*Primary Examiner*—Darren Schuberg
*Assistant Examiner*—Iraj Mohandesi
(74) *Attorney, Agent, or Firm*—Brinks Hofer Gilson & Lione

(57) ABSTRACT

A linear motor having a fixed inductor and a moving part including windings and a stator. The stator includes a plurality of teeth defining a plurality of slots into which the windings are inserted, the stator being segmented into a first piece and a second piece adjacent to the first piece. A joint is defined between the first piece and the second piece. A fastening fastens the first piece to the second piece, wherein the fastening includes a recess disposed in a first lateral surface of the first piece located at the joint, wherein the recess opens exclusively onto the lateral surface and defines at least one locking surface. A complementary part formed from the second piece and which engages the at least one locking surface so as to hold the first lateral surface and a second lateral surface of the second piece against one another.

6 Claims, 2 Drawing Sheets

LINEAR MOTOR WITH A SEGMENTED STATOR

Applicant claims, under 35 U.S.C. § 119, the benefit of priority of the filing date of Nov. 8, 2004 of a Swiss patent application, copy attached, Serial Number 01831/04, filed on the aforementioned date, the entire contents of which is incorporated herein by reference.

BACKGROUND OF THE INVENTION

1. Field of the Invention

The present invention concerns a linear motor whose moving part has a stator formed of several pieces assembled in the longitudinal direction of this moving part.

2. Discussion of Related Art

A linear motor stator, segmented into several pieces or parts that are assembled once these pieces or parts have been produced, has several advantages.

First, it is possible to define a basic piece of elemental length for the body of the stator. During the final assembly of the stator, it is possibly to vary its length in accordance with the type of linear motor built or in accordance with the application for which it is intended, by assembling a variable number of prefabricated basic pieces. Secondly, a structure of this type makes it possible to produce the two end parts or teeth separately from the body of the stator, then assemble them to this body in a subsequent step.

A linear motor whose moving part is formed by a stator comprising a body and end teeth assembled to this body is known from U.S. Pat. No. 6,713,899, the entire contents of which are incorporated herein by reference. The end parts or teeth have an inverted L-shape, with a rectangular end projection that is inserted into an upper recess of the stator, this recess being machined into the upper surface of this body. Thus, the end tooth is attached only at its upper end. The rigidity of such an assembly is not properly assured. Because the end tooth is only attached at its upper end, vibrations can be generated in the lower part located near the motor's permanent magnets. In fact, since the contact between the lateral surfaces at the joint between the end tooth and the body is not maintained by a specific fastening, these lateral surfaces can separate from one another either dynamically, generating vibrations, or statically, creating an air gap between the end part and the body of the stator.

A linear motor with a segmented stator that makes it possible to produce a relatively long stator is known from the document DE 3110339. According to this document, a long stator is produced by assembling elemental stator pieces that define a functional stator having a given overall length. Thus, the elemental stator piece includes a plurality of teeth defining slots for windings and two end teeth whose lower surface defines a plane that is inclined relative to a horizontal direction corresponding to the direction of movement of the stator. The elemental stator pieces are assembled by distinct fastening elements disposed in the upper part of the stator and inserted on either side of the joint between two stator parts in T-shaped recesses produced in the upper surfaces of the two respective stator pieces. These structures for assembly have the same drawbacks as those described in connection with the preceding document. In essence, the stator pieces are joined only by fastenings disposed on the upper surfaces of these stator pieces. Thus, neither a separation of these two pieces nor vibrations can be ruled out. The dynamic behavior of the stator can therefore be disturbed, which is harmful in several applications wherein the moving part is subject to large accelerations. The segmented stator proposed in this document has another major drawback in that the tooth formed at the level of the joint between two stator pieces does not have a flat and horizontal lower surface like that of the other teeth. This increases the reluctance effect of the stator and reduces its efficiency.

OBJECTS AND SUMMARY OF THE INVENTION

An object of the present invention is to provide a linear motor having a segmented stator formed of several pieces that affords a solution to the problems of the above-mentioned prior art.

To this end, the present invention concerns a linear motor having a fixed inductor and a moving part including windings and a stator. The stator includes a plurality of teeth defining a plurality of slots into which the windings are inserted, the stator being segmented into a first piece and a second piece adjacent to the first piece. A joint is defined between the first piece and the second piece. A fastening fastens the first piece to the second piece, wherein the fastening includes a recess disposed in a first lateral surface of the first piece located at the joint, wherein the recess opens exclusively onto the lateral surface and defines at least one locking surface. A complementary part formed from the second piece and which engages the at least one locking surface so as to hold the first lateral surface and a second lateral surface of the second piece against one another.

The result of the characteristics of the present invention is a rigid fastening at the level of the joint between two adjacent stator pieces, which makes it possible to prevent vibrations of the stator during operation and to maintain proper contact between the general lateral surfaces at the joint between two stator pieces.

In a preferred embodiment, the fastenings are formed simply by one or more protruding parts that project from the first and/or second general lateral surface at the joint between first and second adjacent pieces and by one or more respective recess(es) having a shape that substantially corresponds to the protruding part(s) provided in the second and/or said first piece. This or these protruding part(s) are inserted into the respective recess(es) in order to ensure the rigid assembly of the first and second pieces.

In a preferred variant, the protruding parts and the recesses have a dovetail shape.

Preferably, the stator according to the present invention includes a body and two end pieces. The teeth of the body define a lower surface that is substantially flat and horizontal, while the end pieces define end teeth having a lower surface that is non-horizontal, and particularly oblique or rounded.

According to an improvement provided within the scope of the present invention, the fastenings at a joint between two stator pieces are embodied by the profile of their respective lateral surfaces at this joint and have axial symmetry along a central transverse axis. Moreover, the end pieces each have upper and lower surfaces having planar symmetry in a median geometric plane. As a result of these particular characteristics, it is possible to place two identical end parts on the two ends of the stator. It is thus possible to build stators of variable lengths using only two types of pieces, i.e., an elemental stator piece for forming the body of the stator and an end part that can be joined to both ends of the body of the stator.

Other particular characteristics of the present invention, and other advantages, will also emerge from the following description, written in reference to the attached drawings, given as an example that is in no way limiting, in which:

DETAILED DESCRIPTION OF THE PREFERRED EMBODIMENTS

A first preferred embodiment of a linear motor according to the present invention will be described below with the help of FIGS. 1 through 4.

Since the present invention concerns the embodiment of the stator of the moving part of the linear motor, the various figures only schematically represent this stator. One skilled in the art will be familiar with the parts of the linear motor that are not represented, particularly the magnetic track forming a fixed inductor that is disposed opposite the teeth of the stator and the windings that are provided inside the slots defined by the stator.

Figure 1:
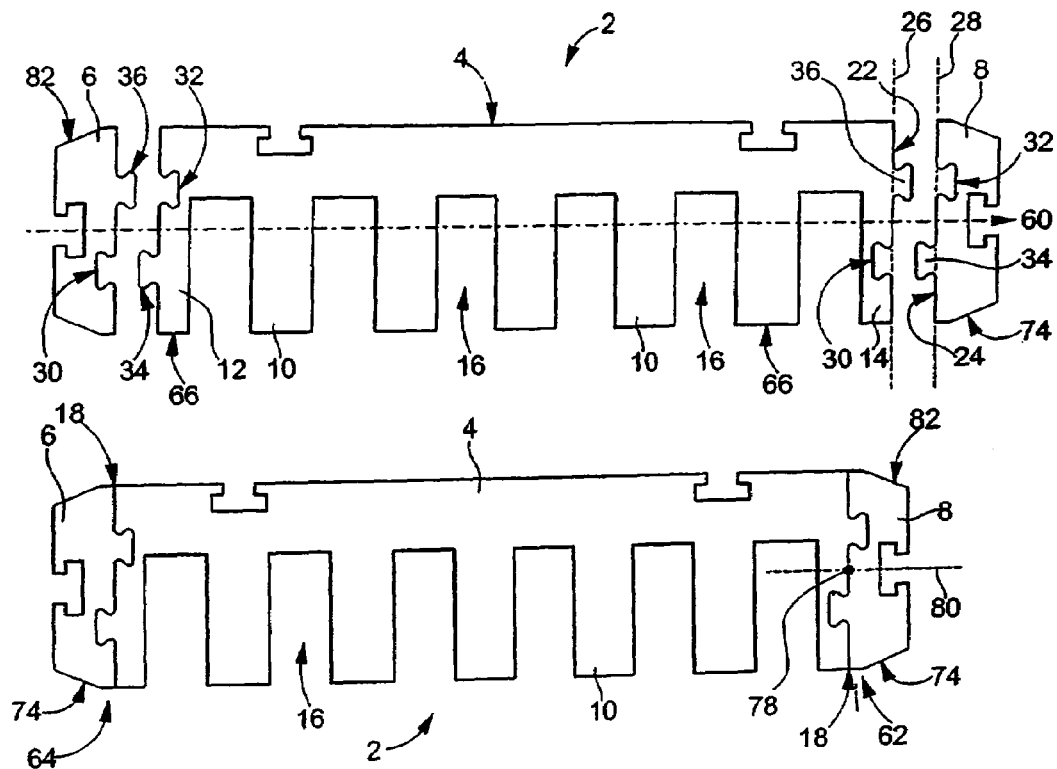
FIG. 1 shows a first preferred embodiment of the present invention before and after assembly of the stator pieces.

The stator 2 represented in FIG. 1 is segmented into three distinct pieces: an elemental piece 4 forming the body of the stator and two end parts 6 and 8 disposed on either side of the piece 4, to which they are joined by fastenings which are specific subjects of the present invention.

The stator piece 4 forming the body of the stator includes a plurality of whole teeth 10 and two partial teeth 12 and 14 at the two ends of this piece 4. These whole and partial teeth define slots 16 into which the windings (not represented) are inserted.

At each joint 18 between two adjacent stator pieces 4 and 6, and respectively 4 and 8, fastenings are provided, disposed inside the general lateral walls 22 and 24 of the two respective adjacent stator pieces. The general lateral surfaces 22 and 24 are defined by the flat transverse surfaces along the two lines 26 and 28. These two general lateral surfaces essentially form the contact surfaces between the adjacent parts at the joint between them, leaving aside the contact surfaces provided at the level of the fastenings themselves. In the preferred, sophisticated embodiment represented in FIGS. 1 through 4, the fastenings include a recess 30, and respectively 32, provided in each of the general lateral surfaces 22 and 24. These two recesses 30 and 32 have a dovetail shape and open exclusively onto the respective general lateral surfaces 22 and 24. Complementary parts 34 and 36, formed by protruding parts that respectively project from the two general lateral surfaces 22 and 24, are respectively disposed at the level of the recesses provided. These protruding parts also have a dovetail shape.

Figure 3:
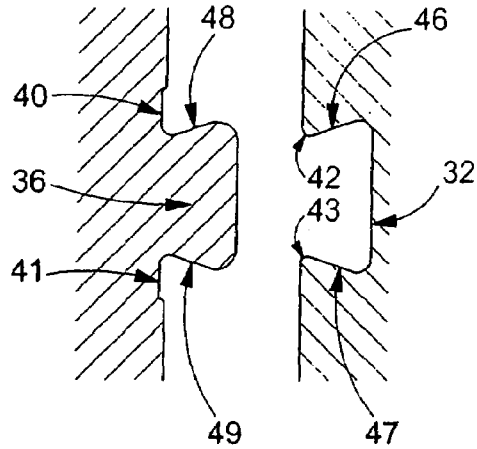
FIGS. 3 and 4 show more clearly the embodiments of the fastenings of the pieces forming the stator of FIGS. 1 and 2 in accordance with the present invention.
Figure 4:
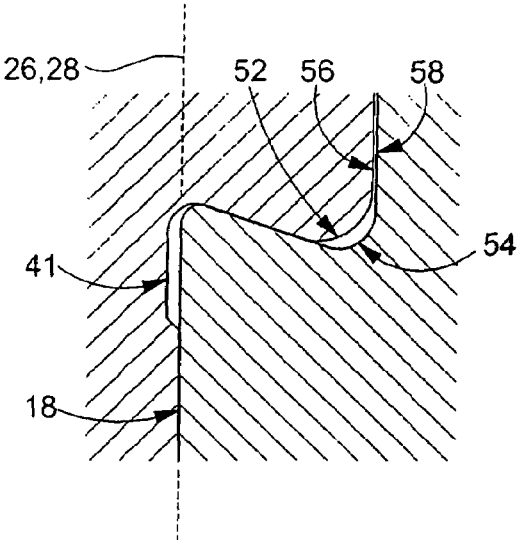

FIGS. 3 and 4 represent, in a partial enlargement, the fastenings of the stator pieces. On either side of the protruding part 36, two slight hollows 40 and 41 are preferably provided, making it possible to form the sides of the protruding part using a specific cutting die and to sufficiently differentiate the base from the protruding part. Free insertion of the edges 42 and 43 of the recess 32 is thus assured. These edges 42 and 43 can even be slightly deformed and enter partially into the hollows 40 and 41. This makes it possible to hold the general lateral surfaces 22 and 24 against one another at the joint 18 between the stator pieces. The recess 32 defines two locking surfaces 46 and 47, against which the corresponding sides 48 and 49 of the protruding part 36 are firmly held. The specific machining of the protruding part 36 with the slight hollow provided on either side of this protruding part and a precise sizing of the recess 32 make it possible to laterally insert or embed the protruding part into the recess, while guaranteeing a rigid contact of the general lateral surfaces 22 and 24, as a result of the pressure contact of the locking surfaces 46 and 47 with the corresponding sides 48 and 49 of the protruding part. In order to avoid a problem with the upper edge 52 of the protruding part, the inner angle 54 of the recess 32 is provided with a bit more depth, and the protruding part is sized so as to prevent the outer surface 56 of this protruding part from pushing against the flat surface 58 of the bottom of the recess 32.

Figure 2:
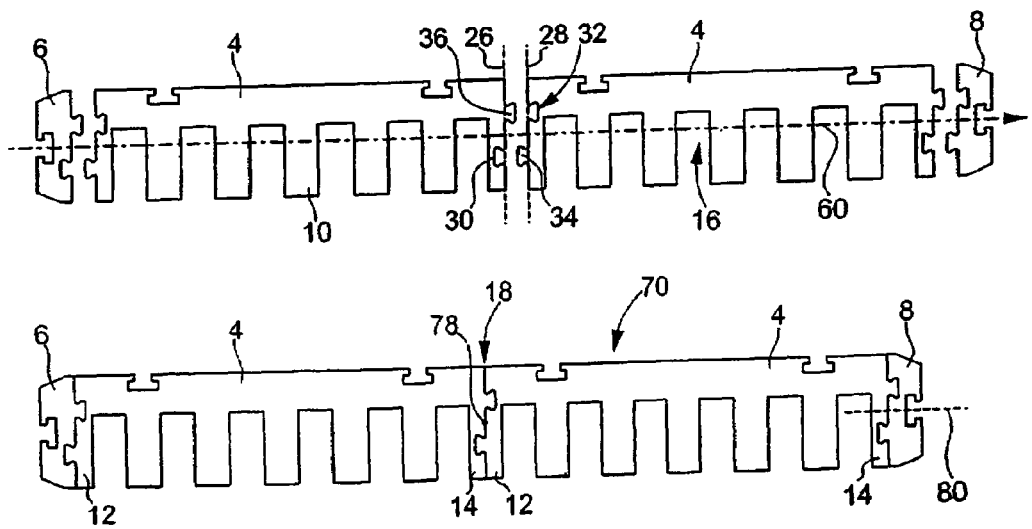
FIG. 2 shows a second embodiment of a stator of a linear motor that is longer than that of FIG. 1, with a body segmented into two identical stator pieces in accordance with the present invention.

Returning to FIG. 1, we see that the stator pieces are assembled in the longitudinal direction 60 of the stator, this longitudinal direction being parallel to the direction of motion of the moving part formed by the stator 2. Secondly, the joint 18 between two adjacent stator pieces runs through a tooth of the stator. The fastenings are at least partly disposed at the level of the respective tooth 62, 64 formed by the joint of the two adjacent stator pieces. In essence, the protruding part 34 and the corresponding recess 30 are disposed at the level of the respective end tooth 62, 64. The elemental piece 4 that forms the body of the stator has whole teeth 10 and two partial teeth 12 and 14, all of which have a lower surface 66 that is horizontal, i.e. parallel to the longitudinal direction 60 and perpendicular to the plane of FIG. 1. This characteristic is particularly advantageous when the body of the stator is segmented, i.e. formed of several elemental stator pieces 4, as represented in FIG. 2. In this FIG. 2, the stator 70 includes a body formed by two identical stator pieces 4 and two end pieces 6 and 8, which are also identical, as will be explained more precisely below. Because of the fact that the partial teeth 12 and 14 at the ends of the stator pieces 4 have a flat and horizontal lower surface, the tooth formed by the joint 18 of the two elemental pieces 4 has a shape identical to that of the whole teeth of these elemental pieces 4, in particular a lower surface that is also flat and horizontal. This makes it possible to avoid any irregularities at the level of the stator.

It will be noted that the fact that the fastenings are provided at least partially at the level of the tooth formed at the joint 18 makes it possible to guarantee a rigid and solid assembly of the two partial teeth 12 and 14 that form the joint tooth.

In order to improve the dynamic behavior of the moving part by reducing the reluctance effect, the end pieces 6 and 8 have a lower surface 74 that is non-horizontal. In the examples represented in FIGS. 1 and 2, the surface 74 has a part that is oriented obliquely relative to the longitudinal direction 60. Since the end parts 6 and 8 are initially produced as distinct elements, it is possible to provide lower surfaces 74 of relatively complex shape, making it possible to optimize the reduction of the reluctance effect.

According to the preferred, sophisticated embodiment represented in FIGS. 1 and 2, the fastenings have axial symmetry along a central transverse axis 78 located at the joint 18 between two adjacent pieces. Moreover, the respective end pieces 6 and 8 have planar symmetry in a median geometric plane 80. Thus, the upper surface 82 of the end pieces 6 and 8 has a profile identical to that of the lower surface 74, the upper surface 82 being the mirror image of the lower surface 74 due to the aforementioned planar symmetry. As a result of this particular characteristic, the end piece 8 need only be rotated 180° around the transverse axis 78 in order to obtain the other end tooth 6 located on the other side of the body of the stator. Thus, the two end teeth 6 and 8 are formed by two identical pieces. By machining only two types of pieces, i.e., an elemental stator piece 4 and an end piece 6, it is possible to produce complete linear motor stators of variable lengths having the various advantages mentioned above. This makes it possible to optimize production and reduce production costs. Moreover, assembly is easy since the two end pieces or teeth are identical in shape.

Figure 5:
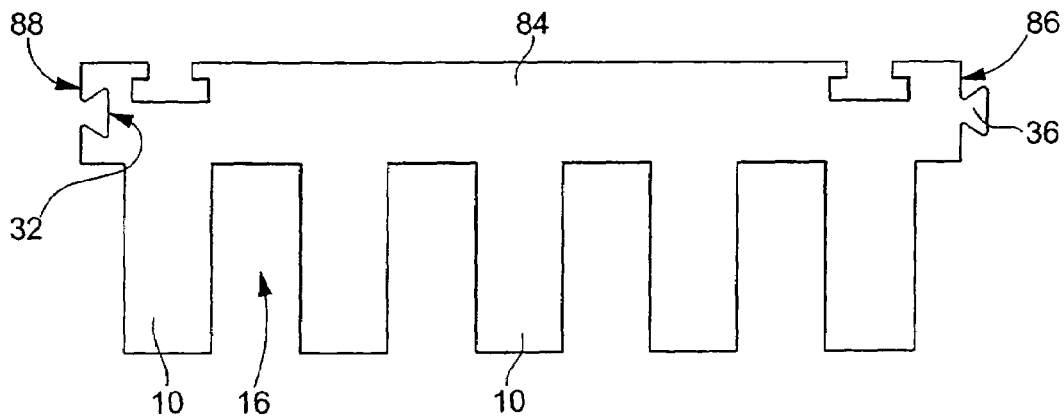
FIG. 5 shows a stator piece of another embodiment of the present invention.

FIG. 5 represents an elemental stator piece 84 of a third embodiment of a linear motor according to the present invention. It will be noted, first of all, that this third embodiment is not as sophisticated as the embodiments shown in FIGS. 1 and 2, and does not retain all of their important advantages. However, this third embodiment does stem from the overall concept of the present invention, which provides for the fastenings of the elemental stator pieces for forming a segmented stator to be located in the joint. Unlike in the first and second embodiments of the present invention, the joint between two adjacent stator pieces is produced at the level of a slot. Thus, the general lateral surfaces in contact at the joint have a length that is shorter than that which results from the layout of the first embodiment. A recess 32 similar to the one described above is provided in the general lateral surface 88. A protruding part 36 that projects from the general lateral surface 86 is provided on the other side of the piece 84. When two pieces of the stator are assembled, the surfaces 86 and 88 are brought into contact and form the joint between these pieces, the fastenings being constituted by the insertion of a protruding part 36 into a dovetail-shaped recess 32. The protruding part 36 and the recess 32 are embodied according to the structural detail represented in FIGS. 3 and 4.

Thus, according to the present invention, the fastenings at a junction between first and second pieces of the stator are formed by one or more protruding part(s) that project from the first and/or second general lateral surface of these two adjacent pieces, and by one or more respective recess(es) provided in the second and/or said first general lateral surface. Each protruding part is inserted into the corresponding recess, which has at least one surface for locking this protruding part so as to rigidly fasten the two adjacent pieces.

It will be noted in particular that it is also possible to provide an assembly of two adjacent pieces at the level of a tooth, as in the case of the first embodiment, with fastenings formed by a single protruding part machined into one piece, preferably relatively wide and dovetail shaped, and inserted into a corresponding recess provided in the other piece.

Figure 6:
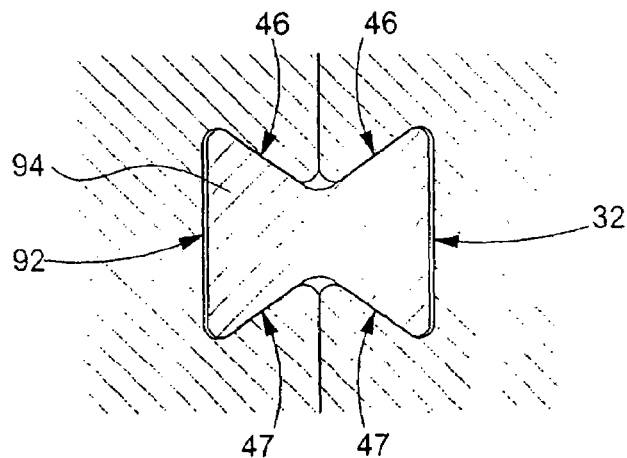
FIG. 6 shows another embodiment of the fastenings of two stator pieces in accordance with the present invention.

With the help of FIG. 6, we will describe a particular embodiment of the fastenings of two adjacent pieces of a segmented stator. In this embodiment, the fastenings include recesses 32 and 92 provided in the two general lateral surfaces of two adjacent pieces located at a joint between these two adjacent pieces. As in the other embodiments, the recesses open exclusively onto the general lateral surfaces of the elemental pieces of the stator. The recesses 32 and 92 are disposed facing one another when the two adjacent pieces are assembled, and a butterfly shaped fastening piece is inserted into the two recesses 32 and 92 so as to hold the two general lateral surfaces against one another. The recesses 32 and 92 each define two locking surfaces 46 and 47 against which the corresponding surfaces of the piece 94 press. This piece 94 can be precisely machined so as to guarantee a very rigid fastening when it is embedded into the two recesses 32 and 92 during the assembly of the stator.

The foregoing description is provided to illustrate the invention, and is not to be construed as a limitation. Numerous additions, substitutions and other changes can be made to the invention without departing from its scope as set forth in the appended claims.

I claim:

1. A linear motor comprising:
   a fixed inductor;
   a moving part comprising:
      windings; and
      a stator comprising:
         a plurality of teeth defining a plurality of slots into which said windings are inserted, said stator being segmented into a first piece and a second piece adjacent to said first piece, wherein a joint is defined between said first piece and said second piece, wherein said stator is formed of a body, a first end piece and a second end piece assembled to either side of said body, wherein said first end piece and said second end piece are identical in shape and have a planar symmetry in a median geometric plane and wherein said plurality of teeth of said body each having an approximately horizontal lower surface, while said first and second end pieces each define a tooth having a non-horizontal lower end surface; and
      a fastening that fastens said first piece to said second piece, wherein said fastening comprises:
         a recess disposed in a first lateral surface of said first piece located at said joint, wherein said recess opens exclusively onto said lateral surface and defines at least one locking surface; and
         a complementary part formed from said second piece and which engages said at least one locking surface so as to hold said first lateral surface and a second lateral surface of said second piece against one another.

2. The linear motor according to claim 1, wherein said complementary part comprises a protruding part that projects from said second lateral surface and said recess has a shape that substantially corresponds to said protruding part and said protruding part being inserted into said recess, each of which has at least one surface for locking said protruding part.

3. The linear motor according to claim 2, wherein said protruding part and said recess have a dovetail shape.

4. The linear motor according to claim 1, wherein said joint passes through one of said plurality of teeth, said fastening being at least partially disposed at a level of said one of said plurality of teeth by a first partial tooth of said first piece and a second partial tooth of said second piece at said joint.

5. The linear motor according to claim 1, wherein said body is formed of a plurality of identical elemental parts.

6. The linear motor according to claim 4, wherein said stator is formed of a body, a first end piece and a second end piece joined to either side of said body, said plurality of teeth and said first partial tooth and said second partial tooth each having an approximately horizontal lower surface, while said first end piece and said second end piece each define a tooth having a non-horizontal lower end surface.

* * * * *